United States Patent [19]
Manhes

[11] 3,950,825
[45] Apr. 20, 1976

[54] CLAMP FOR SECURING AN ELEMENT ON A SUPPORT PROVIDED WITH ALVEOLI AND ASSEMBLY THUS OBTAINED

[75] Inventor: Raymond Jeam Manhes, Rueil-Malmaison, France

[73] Assignee: Rapid S.A., Paris, France

[22] Filed: Apr. 7, 1975

[21] Appl. No.: 565,842

[30] Foreign Application Priority Data
Apr. 11, 1974  France .............................. 74.12817

[52] U.S. Cl. .................................. 24/73 B; 217/24; 403/361
[51] Int. Cl.² .................... A44B 21/00; B65D 25/02
[58] Field of Search ...................... 108/51; 52/753 E; 24/73 B; 229/39 B, 14 C; 206/521; 217/18, 24, 28, 35; 403/361, 372

[56] References Cited
UNITED STATES PATENTS

| | | | |
|---|---|---|---|
| 898,007 | 9/1908 | Rowe .................................. | 217/24 |
| 1,230,985 | 6/1917 | Benson .............................. | 217/35 X |
| 2,379,349 | 6/1945 | Grinde et al. ................ | 24/73 B UX |
| 2,529,219 | 11/1950 | Kost .................................... | 403/361 |
| 2,621,947 | 12/1952 | Markvart ........................ | 403/361 X |
| 2,840,430 | 6/1958 | Winer .............................. | 108/51 UX |
| 3,641,948 | 2/1972 | Brown ................................ | 108/51 |
| 3,664,271 | 5/1972 | Wolder et al. ...................... | 108/51 |

FOREIGN PATENTS OR APPLICATIONS

| | | | |
|---|---|---|---|
| 809,652 | 2/1959 | United Kingdom ................ | 24/73 B |
| 1,163,135 | 9/1969 | United Kingdom .................. | 108/51 |
| 1,283,368 | 12/1961 | France .................................. | 108/51 |

*Primary Examiner*—Donald A. Griffin

[57] ABSTRACT

The present invention relates to a clamp for securing an element in a recess provided in a support. This clamp has the general shape of a parallelepipedic cup and comprises a base portion applied on the bottom of the recess and two pairs of mutually confronting branches including means for anchoring the cup within the recess and the element within the cup.

9 Claims, 6 Drawing Figures

CLAMP FOR SECURING AN ELEMENT ON A SUPPORT PROVIDED WITH ALVEOLI AND ASSEMBLY THUS OBTAINED

The present invention has essentially for its object a clamp for securing an element on a support provided with polygonal alveoli, cells or like cavities, as well as the various assemblies which can be obtained by means of such a clamp.

A certain number of difficulties were hitherto encountered in assembling panels which have to be spaced from one another by spacers or distance-pieces by other means than those usually employed, such as screws, nails or the like. Such a panel assembly is required for example for making pallets.

On the other hand, with the advent of the plastics materials which allow extremely rigid and inexpensive alveolate panels to be obtained, it was essential that assemblies of the aforesaid type should be made by other means than the conventional ones used hitherto and imparting to the assembly all the required qualities of sturdiness, which is indispensable if the said assembly must be subjected to important efforts as for example in the case of pallets, as already mentioned.

The present invention enables the afore-mentioned aims to be achieved by providing a particularly efficient clamp for the assemblies of the aforesaid type and generally all assemblies involving the fixing of an element on a panel or support of plastics material provided with polygonal alveoli.

More specifically, the invention has for its object a clamp characterized in that it is constituted by a base portion adapted to be applied on the bottom of the alveolus of a panel, and by resiliently deformable side-walls, extending upwardly from the said base portion, corresponding to each side of the said alveolus and thus defining a space to accommodate the element to be secured on the panel, the said walls comprising means co-operating with the side of the alveolus and the said element to hold the latter firmly attached to the bottom of the alveolus.

It is thus understood that the clamp is fitted on the element to be secured and is accommodated in the alveolus of the panel. The element is thus very rigidly secured on the panel through the medium of the clamp.

According to another feature of the invention, the external face of the aforesaid side-walls is slightly concave so that the vertical edges of these walls are pressed in the internal corners of the alveolus.

It is understood that the intersection of the sides of the alveolus offers maximum resistance and is thus apt to withstand without risk the strong pressures exerted by the clamp.

It should be noted that, according to a preferred form of embodiment, the said vertical edges of the walls are slightly bent outwardly at an angle of about 45°.

According to another feature of the invention, the edges of the base portion of the clamp are provided with deformable tongues obtained by cutting and turning down a portion of the material of the said walls.

It is thus understood that when the clamp is driven into the alveolus, the tongues are laid flat and embedded in the bottom of the alveoli so as to retain the clamp and therefore the element to be secured.

According to still another feature of the invention, the upper edge of the aforesaid walls is provided with claws or the like capable of penetrating into the element to be secured.

According to another feature of the invention, the aforesaid walls are provided with at least one external rib which abuts against the sides of the alveolus and the concave external surface of the clamp walls.

According to a preferred form of embodiment, the walls of the clamp are four in number and integral with the said base portion which is square. The clamp thus obtained is of course intended to secure an element of square cross-section in a square alveolus of a support.

It should also be noted that the walls of the clamp slightly flare outwardly so as to offer some resistance when being driven into the alveolus, while at the same time causing the claws provided on the walls of the clamp to be anchored in the element to be secured.

The invention is also directed at the assemblies using a clamp having the above-mentioned features, and more particularly the assemblies of two alveolate panels of plastics material spaced from one another by spacers or distance-pieces, in which the ends of the said spacers are attached to the panels by means of the clamps according to the present invention.

The assemblies of this type ensure the obtention of pallets having all the required qualities of strength and rigidity.

Other purposes and advantages of the invention will appear more clearly from the following detailed description made with reference to the appended drawings given solely by way of example and wherein.

Figure 1:
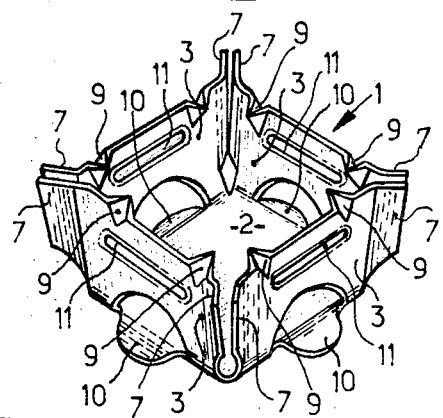
FIG. 1 is a perspective view of a clamp according to the present invention.

Referring to the appended drawings, it is seen that a clamp 1 according to the present invention comprises essentially a base portion 2 and side-walls 3 extending upwardly from the base portion 2, integral with the latter and defining a hollow space to accommodate an element 4 to be secured in an alveolus 5 of an alveolate panel, support or the like 6.

In the example illustrated, the clamp 1 comprises a square base portion 2 and four side-walls 3, but the base portion 2 may have any other appropriate geometrical shape and the walls 3 may be more or less than four in number without departing from the scope of the present invention, this of course depending on the shape of the element 4 to be secured and the shape of the alveoli 5 of the panel 6.

Figure 6:
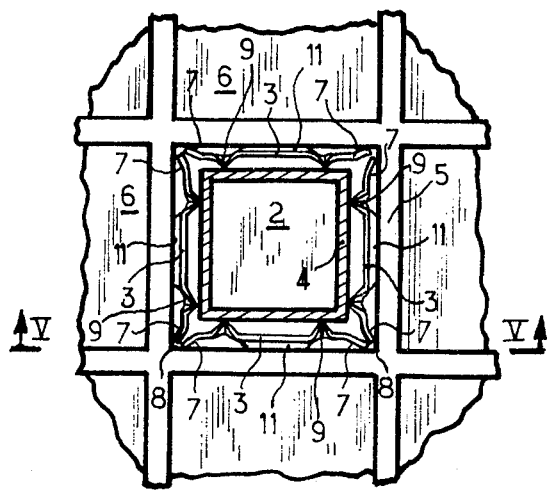
FIG. 6 is a top view of the clamp mounted in the alveolus of a panel.

The external face of the side-walls 3 is generally concave in order that the vertical edges 7 of the said walls be pressed within the internal corners 8 of the alveolus 5, as seen clearly in FIG. 6.

More specifically, this concavity of the walls 3 is obtained by bending outwardly the vertical edges 7 at an angle of about 45°.

At 9 are shown the inwardly projecting claws or the like of the clamp 1. According to the example of embodiment illustrated, each side-wall 3 is provided with two such claws formed on the horizontal upper edge of the said walls.

The edges of the base portion 2 are provided with deformable tongues 10 projecting outwardly from the clamp 1. As seen clearly in the Figures, the tongues 10 are obtained by cutting and turning down a portion of the material of the walls 3 and form with the base portion 2 an angle of about 45°.

The side-walls 3 of the clamp 1 are also provided with at least one external rib 11 projecting outwardly and abutting against the internal sides of the alveolus 5 as clearly seen in FIG. 6, so as to fill up the space comprised between the said sides and the external face of the side-walls 3 of the clamp.

Figure 3:
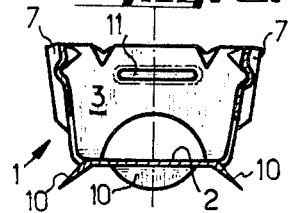
FIG. 3 is a sectional view of the clamp upon the line III—III of FIG. 2.
Figure 2:
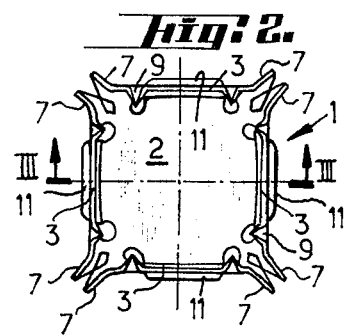
FIG. 2 is a top view of the clamp in FIG. 1.
Figure 4:
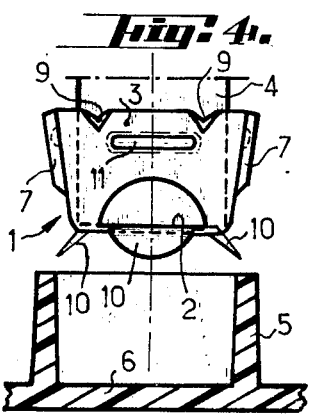
FIG. 4 is an elevational view of the clamp fitted on the end of an element to be secured and ready to be mounted in the alveolus of a panel, support or the like, FIG. 5 is a sectional view upon the line V—V of FIG. 6, showing the clamp mounted in the panel.

As appears clearly from FIGS. 1, 3 and 4, the walls 3 of the clamp 1 slightly flare outwardly, thus imparting to the clamp a slight conicity improving its retention in the alveolus 5 of the panel 6, as will be explained in the following.

Figure 5:
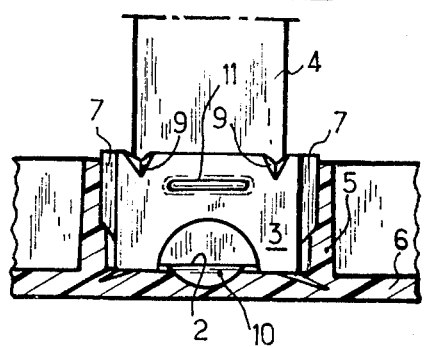

There will now be described the manner in which an element such as 4 is secured on an alveolate panel such as 6 by means of a clamp according to the invention, with more particular reference to FIGS. 4 to 6. at the same time will be described the particular way of using this clamp to make a pallet.

A certain number of elements 4 which, according to the example illustrated, are tubular spacers or distance-pieces of square cross-section are fitted at each end with a clamp 1. The clamps are self-retained at both ends of each spacer owing to a slight nipping effect resulting from the flared shape of the clamp walls 3 and the claws 9 slightly gripping the spacers on their external faces. This appears clearly in FIG. 4.

The spacers thus fitted with their clamps are placed in the square alveoli of a first plate 6, which plate is obtained by moulding a suitable thermoplastic material such as for example polypropylene. The clamps 1 slightly penetrating into this first plate, a second plate is thereafter laid on the assembly, and the alveoli 5 opposite to and coinciding with those of the first plate cover the other end of the spacers 4.

It is then sufficient to apply a strong pressure on the plates so as to make the clmaps 1 penetrate to the bottom of the alveoli. This strong pressure results in a laying flat of the tongues 10 of the base portion 2, the said tongues being advantageously provided with a thinner end to allow them to be embedded in the base portion of the alveoli 5 to ensure a reliable fastening on the plates;

an inflection of the originally flared side-walls 3 towards the centre of the clamp, owing to the vertical edges 7 of the said walls which are pressed against the internal corners 8 of the alveoli 5, and simultaneously the penetration of the claws 9 into the tubular spacers or distance-pieces 4, thus finally ensuring the anchoring of the latter in the two plates.

It should be observed that, according to the example of use just described, any number of spacers such as 4 can be provided to assemble two plates constituting a pallet. The number of spacers depends of course upon the load to be supported.

It has been found that the clamps according to the invention offer maximum pull-out and side-load resistance and compressive strength. There is therefore obtained according to the present invention a particularly efficient clamp for assembling alveolate plates or the like of plastics material for making a pallet, but which can find other applications as well without departing from the scope of the invention.

It should also be noted that the clamp according to the invention is preferably made from mild steel and that any shape and number of claws 9, ribs 11 and side-walls 3 can be used without departing from the scope of the invention.

Consequently, the invention is by no means limited to the form of embodiment described and illustrated which has been given by way of example only. On the contrary, the invention comprises all the technical equivalents to the means described, as well as their combinations if same are carried out according to its gist and used within the scope of the appended claims.

What is claimed is:

1. In an open-topped clamp adapted to secure an element in a socket formed in a support member which socket is substantially U-shaped in cross-section, the base portion of which clamp is adapted to rest at the bottom of said socket and the clamp having means for anchoring the element in the socket, the improvement comprising: a polygonal base portion having substantially the same shape as the socket in the support member; side walls integral with and equal in number to the number of sides of the base portion and extending upwardly therefrom, the external faces of said side walls being slightly concave so as to allow the vertical edges of the side walls to be pressed within the internal corners of the socket; and anchoring means on said side walls for anchoring the said element in said clamp and said clamp in said socket.

2. A clamp according to claim 1, wherein the edges of said base portion forming the bottom thereof are provided with outwardly projecting deformable tongues struck from the material of the said walls.

3. A clamp according to claim 2, wherein the tongues of the base portion form with the latter an angle of about 45°.

4. A clamp according to claim 1, wherein each of the said side-walls has an upper edge provided with claws capable of penetrating into the said element.

5. A clamp according to claim 1, wherein each of the said side-walls is provided with at least one external rib adapted to abut against the sides of the socket.

6. A clamp according to claim 1, wherein the vertical edges of the walls are slightly bent outwardly at an angle substantially equal to 45°.

7. A clamp according to claim 1, wherein each of the said side-walls is slightly flared upwardly and outwardly.

8. A clamp according to claim 1, wherein said base portion is square and two pairs of mutually opposed side walls extend upwardly therefrom.

9. A clamp according to claim 1, wherein said upwardly extending side walls are spaced from each other.

* * * * *